Patented Apr. 11, 1950

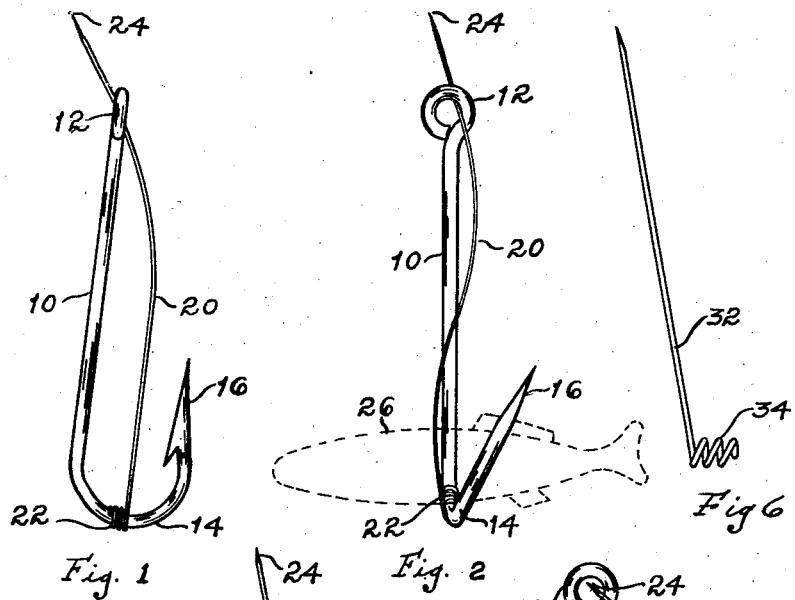
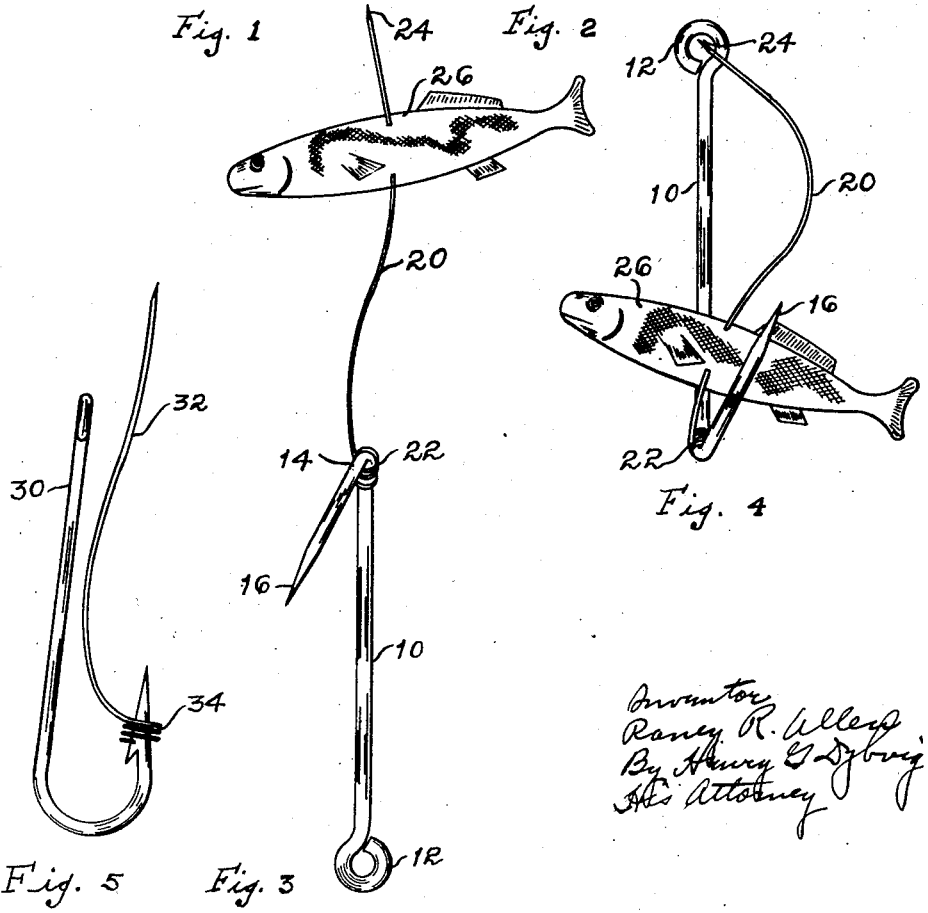

2,503,573

UNITED STATES PATENT OFFICE 2,503,573

FISHHOOK

Raney R. Allen, Dayton, Ohio

Application May 7, 1945, Serial No. 592,344

2 Claims. (Cl. 43—44.8)

This invention relates to a fishhook and more particularly to a fishhook that is adapted to prolong the life of the bait.

In fishing it is oftentimes advantageous to use live bait. When live bait is used, the common practice in the past has been to pass the barb of the fishhook through the body of the bait, usually causing a fatal wound to the bait. The wound causes almost instantaneous death of the bait in the majority of cases, thereby greatly reducing the benefits of the use of a live bait.

An object of this invention is to provide bait-holding means for holding a live bait in the vicinity of a fishhook without fatally injuring the bait.

Another object of this invention is to provide a fishhook that may hold the live bait in proper relation with respect to the fishhook without the fishhook extending through the body of the bait.

Another object of this invention is to provide a fishhook for supporting a live bait, which fishhook is readily produced from inexpensive materials with little labor.

Other objects and advantages reside in the construction of parts, the combination thereof and the mode of operation, as will become more apparent from the following description.

In the drawings, Figure 1 is a side elevational view of a fishhook provided with a bait-holding attachment.

Figure 2 is a front elevational view of the fishhook and the bait-holding attachment, as viewed from the right of Figure 1.

Figure 3 discloses a minnow that is being inserted on the fishhook attachment associated with the fishhook.

Figure 4 is a front perspective view of a fishhook provided with a live bait attachment having a minnow mounted thereon.

Figure 5 is a side elevational view of a fishhook used in connection with a modified bait-holding attachment shown in the process of insertion.

Figure 6 discloses the modified bait-holding attachment prior to insertion upon the fishhook.

Referring to the drawings, the shank 10 of a fishhook is provided with an eye 12, a loop 14 and a barb 16. The fishhook per se is shown as illustrative of any conventional fishhook.

It is well known to anglers that a live bait, such as a minnow, that has been pierced by the barb 16, is oftentimes so severely injured or wounded that the minnow dies almost instantly thereafter. This is readily understood, for the reason that it is practically impossible to pass the barb through the body of a minnow without injuring the vitals of the minnow.

In order to bait a fishhook with a live bait without injuring the vitals of the bait, an attachment has been provided that consists of a spring wire 20, that may be made from high carbon steel, sometimes referred to as piano wire, that has one end 22 coiled as by wrapping it around the loop 14 of the fishhook. The spring wire between the loop 14 and the sharpened point 24 includes a straight-way portion merging into a slightly curved portion. The opposite end of the spring wire 20 is provided with a sharp, needle-like point 24. This point 24 may be passed through a suitable non-vital portion of the bait, such as a minnow 26, shown in Figure 3. After the bait has been pierced by the bait-holding spring wire 20, the end 24 of this wire 20 may be passed through the eye 12, so as to cause the bait to lie across the loop of the fishhook. When in this position, the bait is in substantially the same position as it would be if the hook proper penetrated the body of the bait. If anything, the bait is located in a more advantageous position, for the reason that the bait is supported upon the loop. Whenever the fish takes the bait, it also takes the hook.

This attachment greatly prolongs the life of the minnow used as a bait, in that the injury is not as severe and the wire attachment preferably extends through a non-vital portion of the minnow. Furthermore, the bait is supported by the loop of the hook, so that the bait-retaining wire 20 merely fastens the bait in a position to be carried by the loop of the fishhook.

In the modification disclosed in Figures 5 and 6, a fishhook 30 is shown that may be any conventional type of fishhook. The bait-holding attachment 32 is provided with a preformed series of convolutions 34 adjacent one end thereof and of such a dimension that these convolutions may be slipped over or threaded over the barb of the fishhook and coiled around the loop thereof in the same position as disclosed in the preferred embodiment. This attachment shown in Figures 5 and 6 may be fabricated and sold to anglers who may insert the attachment upon conventional fishhooks in their possession. The operation of the attachment as disclosed in Figures 5 and 6 is identical to that described in connection with the preferred embodiment.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The combination with a fishhook having a shank, a loop, a barb and an eye, of an attachment including a spring wire having one end coiled around the loop of the fishhook and the other end extending through the eye so as to support a bait pierced by the attachment and positioned in proximity to the hook.

2. In combination with a fishhook having a shank, a loop, a barb and means for attaching the shank to a line, bait-holding means including a spring wire having a straight-way portion and a slightly curved portion terminating in a sharpened point on one end, the opposite end of the wire being coiled around the loop of the fishhook, the sharpened end being secured to the means for attaching the shank to the line.

RANEY R. ALLEN.

REFERENCES CITED

The following references are of record in the file of this patent:

UNITED STATES PATENTS

| Number | Name | Date |
|---|---|---|
| 911,040 | Hickey | Feb. 2, 1909 |
| 1,261,601 | Ore | Apr. 2, 1918 |
| 2,051,651 | Pachner et al. | Aug. 18, 1936 |
| 2,222,554 | Wirth et al. | Nov. 19, 1940 |